(12) United States Patent
Lin et al.

(10) Patent No.: US 12,288,652 B1
(45) Date of Patent: Apr. 29, 2025

(54) ICON DISPLAY MODULE

(71) Applicant: Primax Electronics Ltd., Taipei (TW)

(72) Inventors: Jia-Hung Lin, Taipei (TW); Hui-Ling Lin, Taipei (TW)

(73) Assignee: Primax Electronics Ltd., Taipei (TW)

( * ) Notice: Subject to any disclaimer, the term of this patent is extended or adjusted under 35 U.S.C. 154(b) by 62 days.

(21) Appl. No.: 18/518,298

(22) Filed: Nov. 22, 2023

(30) Foreign Application Priority Data

Nov. 1, 2023 (TW) ................................. 112142113

(51) Int. Cl.
*H01H 13/00* (2006.01)
*H01H 13/83* (2006.01)
*G06F 3/023* (2006.01)

(52) U.S. Cl.
CPC ............. *H01H 13/83* (2013.01); *G06F 3/023* (2013.01); *H01H 2219/039* (2013.01); *H01H 2219/062* (2013.01)

(58) Field of Classification Search
CPC ................................. G06F 3/023; H01H 13/83
See application file for complete search history.

(56) References Cited

U.S. PATENT DOCUMENTS

| | | | |
|---|---|---|---|
| 11,257,637 B2 * | 2/2022 | Yen | H01H 13/70 |
| 11,861,079 B1 * | 1/2024 | Yeh | G02B 6/0068 |
| 2010/0147661 A1 * | 6/2010 | Takeda | H01H 13/83 |
| | | | 200/314 |
| 2017/0059136 A1 * | 3/2017 | Annerino | G02B 6/0088 |
| 2018/0233303 A1 * | 8/2018 | Wu | H01H 13/023 |
| 2021/0063632 A1 * | 3/2021 | Ho | G02B 6/0076 |
| 2021/0357076 A1 * | 11/2021 | Zheng | G06F 3/0446 |
| 2023/0109942 A1 * | 4/2023 | Qiu | G01S 7/4814 |
| | | | 356/4.01 |
| 2024/0337402 A1 * | 10/2024 | Read | G02B 6/0068 |
| 2024/0353608 A1 * | 10/2024 | Wang | G02B 6/0061 |

* cited by examiner

*Primary Examiner* — Gerald J Sufleta, II
(74) *Attorney, Agent, or Firm* — KIRTON McCONKIE; Evan R. Witt (57) ABSTRACT

An icon display module includes a light blocking structure, a first light-emitting element, a second light-emitting element, a first light-guiding pattern structure and a second light-guiding pattern structure. The light blocking structure includes an accommodation space and a first light-blocking part. The accommodation space is divided into a first region and a second region by the first light-blocking part. When the first light-emitting element emits a first light beam, the first light beam is guided by the first light-guiding pattern structure and the second light-guiding pattern structure and projected on the target. Consequently, a first icon and a second icon are shown on the target. When the second light-emitting element emits a second light beam, the second light beam is guided by the first light-guiding pattern structure and projected to the target. Consequently, the first icon is shown on the target.

8 Claims, 6 Drawing Sheets

ICON DISPLAY MODULE

FIELD OF THE INVENTION

The present invention relates to an icon display module, and more particularly to an icon display module for an input device.

BACKGROUND OF THE INVENTION

With increasing development of science and technology, a variety of electronic devices are designed in views of convenience and user-friendliness. For helping the user well operate the electronic devices, the electronic devices are gradually developed in views of humanization. The input devices of the common electronic devices include for example mouse devices, keyboard devices, trackball devices, or the like.

Nowadays, the input devices on the market are becoming more and more diversified, and the simplicity, convenience and uniqueness of the operation interfaces are increasingly required. Consequently, various shortcut function keys are designed on various input devices. Generally, some icons dedicated to specified functions are formed on the corresponding shortcut function keys. By viewing the icons, users can clearly realize the functions represented by the shortcut function keys. Consequently, the user can switch or activate the required functions more quickly through shortcut function keys.

However, the conventional design of the shortcut function keys on the commercially available input devices still has some drawbacks. For example, each graphic pattern on the icon is assigned to the corresponding shortcut function key. In other words, the input device needs to be equipped with so many shortcut function keys. Under this circumstance, users cannot quickly find the shortcut function keys they need, or the number of shortcut function keys needs to be appropriately reduced. Consequently, the convenience of using the shortcut function keys is largely reduced.

Therefore, there is a need of providing an improved icon display module in order to overcome the above drawbacks.

SUMMARY OF THE INVENTION

An object of the present invention provides an icon display module. Through the icon display module, different combined icons can be shown on a same shortcut function key.

The other objects and advantages of the present invention will be understood from the disclosed technical features.

In accordance with an aspect of the present invention, an icon display module is provided. The icon display module includes a light blocking structure, a first light-emitting element, a second light-emitting element, a first light-guiding pattern structure and a second light-guiding pattern structure. The light blocking structure includes an accommodation space and a first light-blocking part. The accommodation space is divided into a first region and a second region by the first light-blocking part. The first light-emitting element is disposed within the accommodation space. The second light-emitting element is disposed within the accommodation space. The first light-guiding pattern structure is disposed within the accommodation space. The first light-guiding pattern structure is included in the first region. The second light-guiding pattern structure is disposed within the accommodation space. The second light-guiding pattern structure is included in the second region. When the first light-emitting element emits a first light beam, the first light beam is transferred through both of the first region and the second region, and the first light beam is irradiated on both of the first light-guiding pattern structure and the second light-guiding pattern structure. The first light beam is guided by the first light-guiding pattern structure and the second light-guiding pattern structure and projected on the target. Consequently, a first icon and a second icon are shown on the target. When the second light-emitting element emits a second light beam, the second light beam is blocked by the first light-blocking part, and the second light beam is permitted to be transferred through the first region only. The second light beam is irradiated on the first light-guiding pattern structure, and the second light beam is guided by the first light-guiding pattern structure and projected to the target. Consequently, the first icon is shown on the target.

In an embodiment, the light blocking structure further includes a first lateral wall, a second lateral wall, a third lateral wall and a fourth lateral wall. The first lateral wall and the second lateral wall are opposed to each other. The third lateral wall and the fourth lateral wall are opposed to each other. The third lateral wall and the fourth lateral wall are arranged between the first lateral wall and the second lateral wall. The accommodation space is defined by the first lateral wall, the second lateral wall, the third lateral wall and the fourth lateral wall collaboratively. The first light-blocking part is installed on the second lateral wall. The first light-blocking part is protruded from the second lateral wall and extended in a direction toward the first lateral wall. There is a gap between the first light-blocking part and the first lateral wall.

In an embodiment, the light blocking structure further includes a first concave structure and a second concave structure. The first concave structure is formed in the first lateral wall. The first concave structure and the first light-blocking part are opposed to each other. The second concave structure is formed in the second lateral wall. The second concave structure and the first light-blocking part are located beside each other. The first light-emitting element is disposed within the first concave structure. The second light-emitting element is disposed within the second concave structure.

In an embodiment, the icon display module further includes a third light-guiding pattern structure, and the light blocking structure further includes a second light-blocking part. The accommodation space is divided into the first region, the second region and a third region by the first light-blocking part and the second light-blocking part. The third light-guiding pattern structure is disposed within the accommodation space and included the third region. When the first light-emitting element emits the first light beam, the first light beam is blocked by the second light-blocking part, and the first light beam is permitted to be transferred through the first region and the second region only. The first light beam is irradiated on both of the first light-guiding pattern structure and the second light-guiding pattern structure. The first light beam is guided by the first light-guiding pattern structure and the second light-guiding pattern structure and projected on the target. Consequently, the first icon and the second icon are shown on the target. When the second light-emitting element emits the second light beam, the second light beam is blocked by the first light-blocking part, and the second light beam is permitted to be transferred through the first region and the third region only. The second light beam is irradiated on both of the first light-guiding pattern structure and the third light-guiding pattern structure, and the second light beam is guided by the first light-guiding pattern structure and the third light-guiding pattern structure and projected on the target. Consequently, the first icon and a third icon are shown on the target.

In an embodiment, the light blocking structure further includes a first lateral wall, a second lateral wall, a third lateral wall and a fourth lateral wall. The first lateral wall and the second lateral wall are opposed to each other. The third lateral wall and the fourth lateral wall are opposed to each other. The third lateral wall and the fourth lateral wall are arranged between the first lateral wall and the second lateral wall. The accommodation space is defined by the first lateral wall, the second lateral wall, the third lateral wall and the fourth lateral wall collaboratively. The first light-blocking part is installed on the second lateral wall. The second light-blocking part is installed on the first lateral wall. The first light-blocking part is protruded from the second lateral wall and extended in a direction toward the first lateral wall. The second light-blocking part is protruded from the first lateral wall and extended in a direction toward the second lateral wall. There is a gap between the first light-blocking part and the second light-blocking part.

In an embodiment, the light blocking structure further includes a first concave structure and a second concave structure. The first concave structure and the second concave structure are opposed to each other. The first concave structure is formed in the first lateral wall. The first concave structure and the second light-blocking part are located beside each other. The second concave structure is formed in the second lateral wall. The second concave structure and the first light-blocking part are located beside each other. The first light-emitting element is disposed within the first concave structure. The second light-emitting element is disposed within the second concave structure.

In an embodiment, a color of the first light beam from the first light-emitting element and a color of the second light beam from the second light-emitting element are different.

In an embodiment, the icon display module is installed in an input device, and the target is a shortcut function key installed on the input device.

From the above descriptions, the present invention provides an icon display module. Through the icon display module, different combined icons can be shown on a same shortcut function key. Consequently, when the icon display module is installed on the input device, the shortcut function key on the input device can be designed to trigger two different shortcut functions. In this way, the number of shortcut function keys on the input device can be greatly reduced, allowing the user to quickly memorize and find the locations of the shortcut function keys. Consequently, the cost is reduced, and the user's operational convenience is largely enhanced. As mentioned above, a shortcut function key is designed to trigger two different shortcut functions. From a product design perspective, more shortcut function keys can be added to the input device in order to further improve the user's operational convenience.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
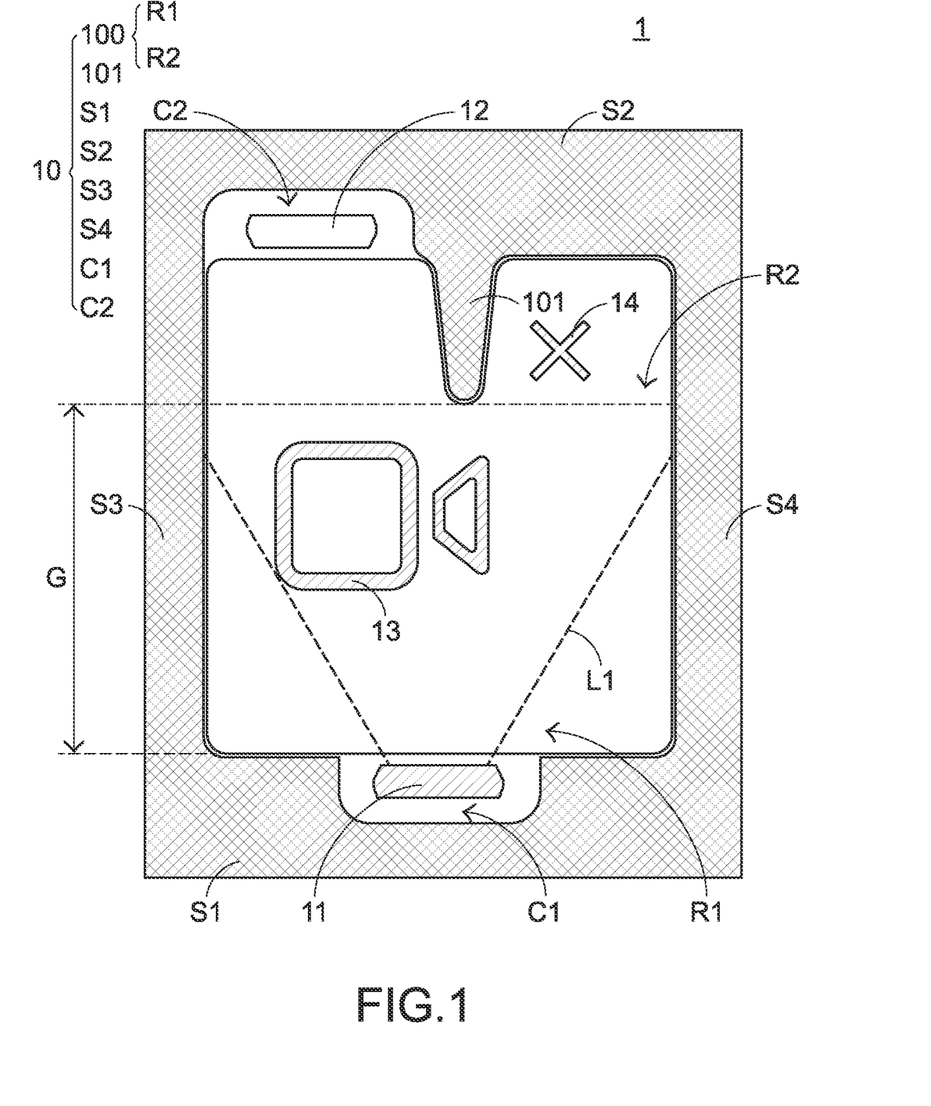
FIG. 1 schematically illustrates an icon display module according to a first embodiment of the present invention, in which the icon display module is in a first usage status.
Figure 2:
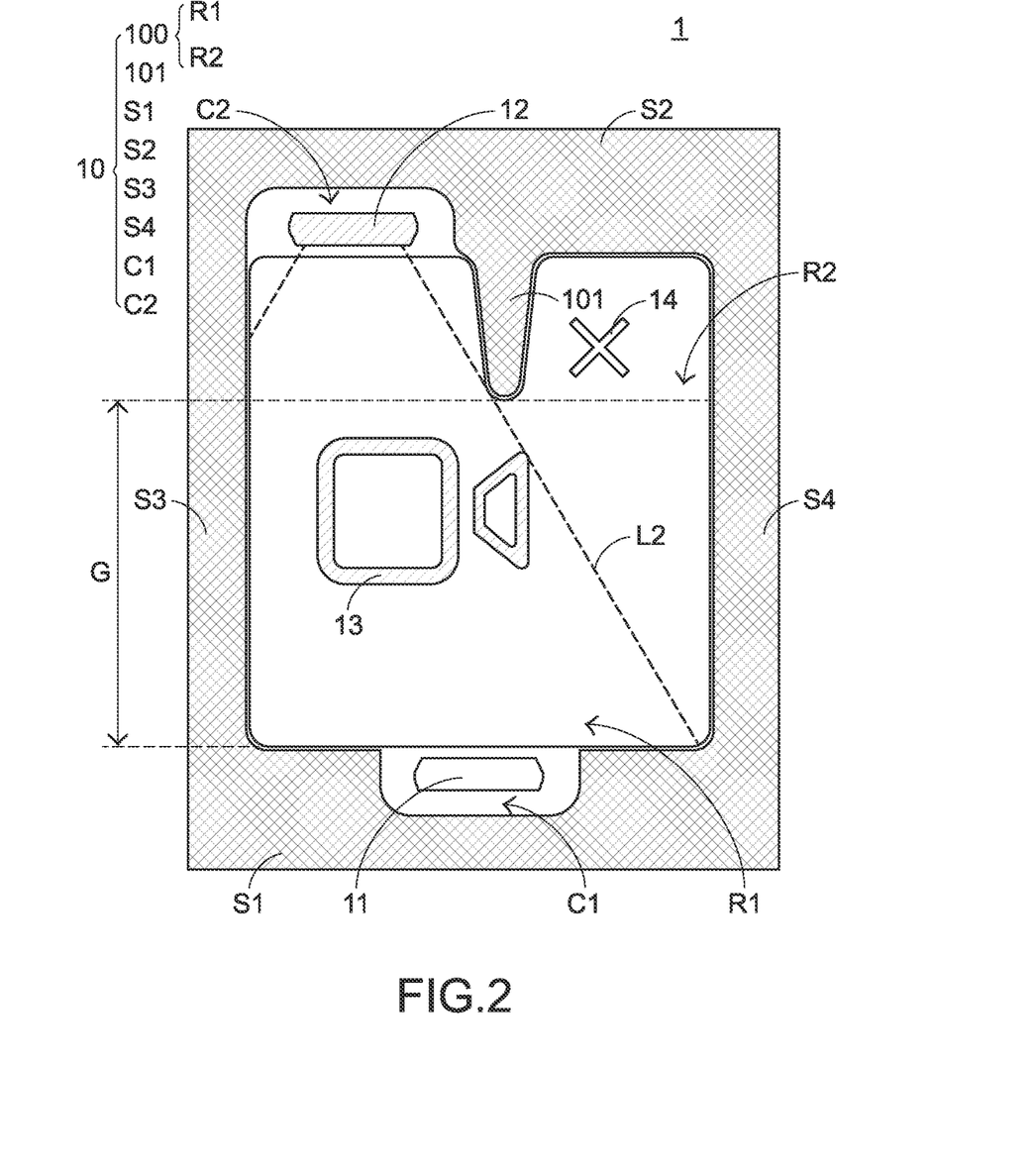
FIG. 2 schematically illustrates the icon display module according to the first embodiment of the present invention, in which the icon display module is in a second usage status.
Figure 3:
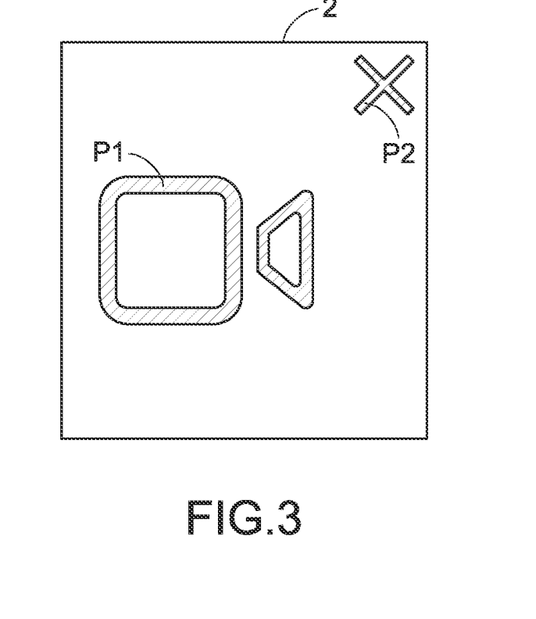
FIG. 3 schematically illustrates a target showing an icon corresponding to the icon display module of FIG. 1.
Figure 4:
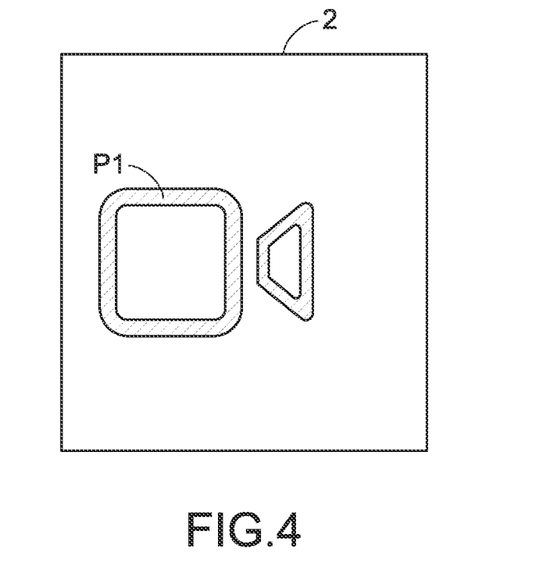
FIG. 4 schematically illustrates a target showing an icon corresponding to the icon display module of FIG. 2.

Please refer to FIGS. 1, 2, 3 and 4. FIG. 1 schematically illustrates an icon display module according to a first embodiment of the present invention, in which the icon display module is in a first usage status. FIG. 2 schematically illustrates the icon display module according to the first embodiment of the present invention, in which the icon display module is in a second usage status. FIG. 3 schematically illustrates a target showing an icon corresponding to the icon display module of FIG. 1. FIG. 4 schematically illustrates a target showing an icon corresponding to the icon display module of FIG. 2.

As shown in FIGS. 1 and 2, the icon display module 1 comprises a light blocking structure 10, a first light-emitting element 11, a second light-emitting element 12, a first light-guiding pattern structure 13 and a second light-guiding pattern structure 14.

The light blocking structure 10 comprises an accommodation space 100 and a first light-blocking part 101. The first light-blocking part 101 of the light blocking structure 10 is disposed within the accommodation space 100. In addition, the accommodation space 100 is divided into a first region R1 and a second region R2 by the first light-blocking part 101.

The first light-emitting element 11 is disposed within the accommodation space 100 of the light blocking structure 10. The second light-emitting element 12 is also disposed within the accommodation space 100 of the light blocking structure 10.

The first light-guiding pattern structure 13 is disposed within the accommodation space 100 of the light blocking structure 10. In addition, the first light-guiding pattern structure 13 is included in the first region R1 of the accommodation space 100.

The second light-guiding pattern structure 14 is disposed within the accommodation space 100 of the light blocking structure 10. In addition, the second light-guiding pattern structure 14 is included in the second region R2 of the accommodation space 100.

The other structures of the icon display module 1 will be described in more details as follows.

Please refer to FIGS. 1 and 2 again. In this embodiment, the light blocking structure 10 further comprises a first lateral wall S1, a second lateral wall S2, a third lateral wall S3 and a fourth lateral wall S4. The first lateral wall S1 and the second lateral wall S2 of the light blocking structure 10 are opposed to each other. The third lateral wall S3 and the fourth lateral wall S4 of the light blocking structure 10 are opposed to each other. In addition, the third lateral wall S3 and the fourth lateral wall S4 are arranged between the first lateral wall S1 and the second lateral wall S2. In this embodiment, the accommodation space 100 of the light blocking structure 10 is defined by the first lateral wall S1, the second lateral wall S2, the third lateral wall S3 and the fourth lateral wall S4 collaboratively. The first light-blocking part 101 of the light blocking structure 10 is installed on the second lateral wall S2. That is, the first light-blocking part 101 is protruded from the second lateral wall S2. Particularly, the first light-blocking part 101 is protruded from the second lateral wall S2 and extended in a direction toward the first lateral wall S1. In addition, there is a gap G between the first light-blocking part 101 and the first lateral wall S1.

Please refer to FIGS. 1 and 2 again. In this embodiment, the light blocking structure 10 further comprises a first concave structure C1 and a second concave structure C2. The first concave structure C1 of the light blocking structure 10 is formed in the first lateral wall S1. In addition, the first concave structure C1 and the first light-blocking part 101 are opposed to each other. The second concave structure C2 is formed in the second lateral wall S2. In addition, the second concave structure C2 and the first light-blocking part 101 are located beside each other. In this embodiment, the first light-emitting element 11 of the icon display module 1 is disposed within the first concave structure C1. That is, the first light-emitting element 11 is located at a position facing the first light-blocking part 101. The second light-emitting element 12 is disposed within the second concave structure C2. That is, the second light-emitting element 12 is located at a position beside the first light-blocking part 101.

The operations of the icon display module 1 will be described in more details as follows.

When the icon display module 1 is operated in different usage statuses, different icons can be shown on the same target 2.

Please refer to FIGS. 1 and 3. In the first usage status, the first light-emitting element 11 of the icon display module 1 emits a first light beam L1. The first light beam L1 is not blocked by the first light-blocking part 101. When the first light beam L1 is transferred through both of the first region R1 and the second region R2 of the accommodation space 100, the first light beam L1 is irradiated on both of the first light-guiding pattern structure 13 in the first region R1 and the second light-guiding pattern structure 14 in the second region R2. Consequently, the first light beam L1 is guided by the first light-guiding pattern structure 13 and the second light-guiding pattern structure 14 and projected on the target 2. Under this circumstance, a first icon P1 corresponding to the first light-guiding pattern structure 13 and a second icon P2 corresponding to the second light-guiding pattern structure 14 are shown on the target 2.

Please refer to FIGS. 2 and 4. In the second usage status, the second light-emitting element 12 of the icon display module 1 emits a second light beam L2. Since the second light beam L2 is blocked by the first light-blocking part 101, the second light beam L2 can be transferred through the first region R1 of the accommodation space 100 only. When the second light beam L2 is transferred through the first region R1 of the accommodation space 100, the second light beam L2 is irradiated on the first light-guiding pattern structure 13 in the first region R1. Consequently, the second light beam L2 is guided by the first light-guiding pattern structure 13 and projected to the target 2. Under this circumstance, the first icon P1 corresponding to the first light-guiding pattern structure 13 is shown on the target 2.

In this embodiment, the color of the first light beam L1 from the first light-emitting element 11 and the color of the second light beam L1 from the second light-emitting element 12 are different. For example, the color of the first light beam L1 is red, and the color of the second light beam L2 is green. It is noted that the color of the first light beam L1 is not restricted to the red color, and the color of the second light beam L2 is not restricted to the green color. In the first usage status, the first light-emitting element 11 emits the first light beam L1. After the first light beam L1 is guided by both of the first light-guiding pattern structure 13 and the second light-guiding pattern structure 14 and projected to the target 2, the first icon P1 and the second icon P2 in the red color are shown on the target 2. In the second usage status, the second light-emitting element 12 emits the second light beam L2. After the second light beam L2 is guided by the first light-guiding pattern structure 13 and projected to the target 2, the first icon P1 in the green color is shown on the target 2. Preferably but not exclusively, the first light-emitting element 11 and the second light-emitting element 12 are diodes.

The icon display module 1 is installed in an electronic device. For example, the electronic device is a mouse device, a keyboard device, a trackball device, or the like. In case that the input device is a keyboard device, the keyboard device comprises plural keys. These keys are classified into some types, e.g., ordinary keys, numeric keys and shortcut function keys. When one of the plural keys is depressed by the user's finger, the keyboard device generates a corresponding key signal to a computer, and thus the computer executes a corresponding function. For example, when an ordinary key is depressed, a corresponding English letter or symbol is inputted into the computer. When a numeric key is depressed, a corresponding number is inputted into the computer. In addition, the shortcut function keys can be programmed to provide various quick access functions. In an embodiment, the installation position of the icon display module 1 is located under a corresponding shortcut function key (i.e., the target 2).

As mentioned above, different combined icons can be shown on a same shortcut function key through the icon display module 1 in different usage statuses. Consequently, when the icon display module 1 is installed on a keyboard device (i.e., the target 2), the shortcut function key on the keyboard device can be designed to trigger two different shortcut functions. For example, in case that the shortcut function key is in the operation status of triggering a first shortcut function (e.g., in the operation status of disabling a webcam lens function), the icon corresponding to the first shortcut function is shown on the shortcut function key through the icon display module 1. For example, as shown in FIG. 3, the icon corresponding to the first shortcut function is a combined icon of the first icon P1 and the second icon P2. Whereas, in case that the shortcut function key is in the operation status of triggering a second shortcut function (e.g., in the operation status of enabling the webcam lens function), the icon corresponding to a second shortcut function is shown on the shortcut function key through the icon display module 1. For example, as shown in FIG. 4, the icon corresponding to the second shortcut function is the first icon P1.

In an embodiment, the operation status of the shortcut function key can be switched between the operation status of triggering the first shortcut function and the operation status of triggering the second shortcut function in response to a switching signal. The switching signal is outputted from another key on the input device. Furthermore, when one of the two operation statuses is switched to the other operation statue, the corresponding icon is shown on the shortcut function key. For example, when the operation status of the shortcut function key is switched from the operation status of triggering the first shortcut function to the operation status of triggering the second shortcut function in response to the switching signal, the second light-emitting element 12 of the icon display module 1 emits the second light beam L2. After the second light beam L2 is guided by the first light-guiding pattern structure 13 in the first region R1 and projected to the shortcut function key, the first icon P1 corresponding to the second shortcut function is shown on the shortcut function key.

Figure 5:
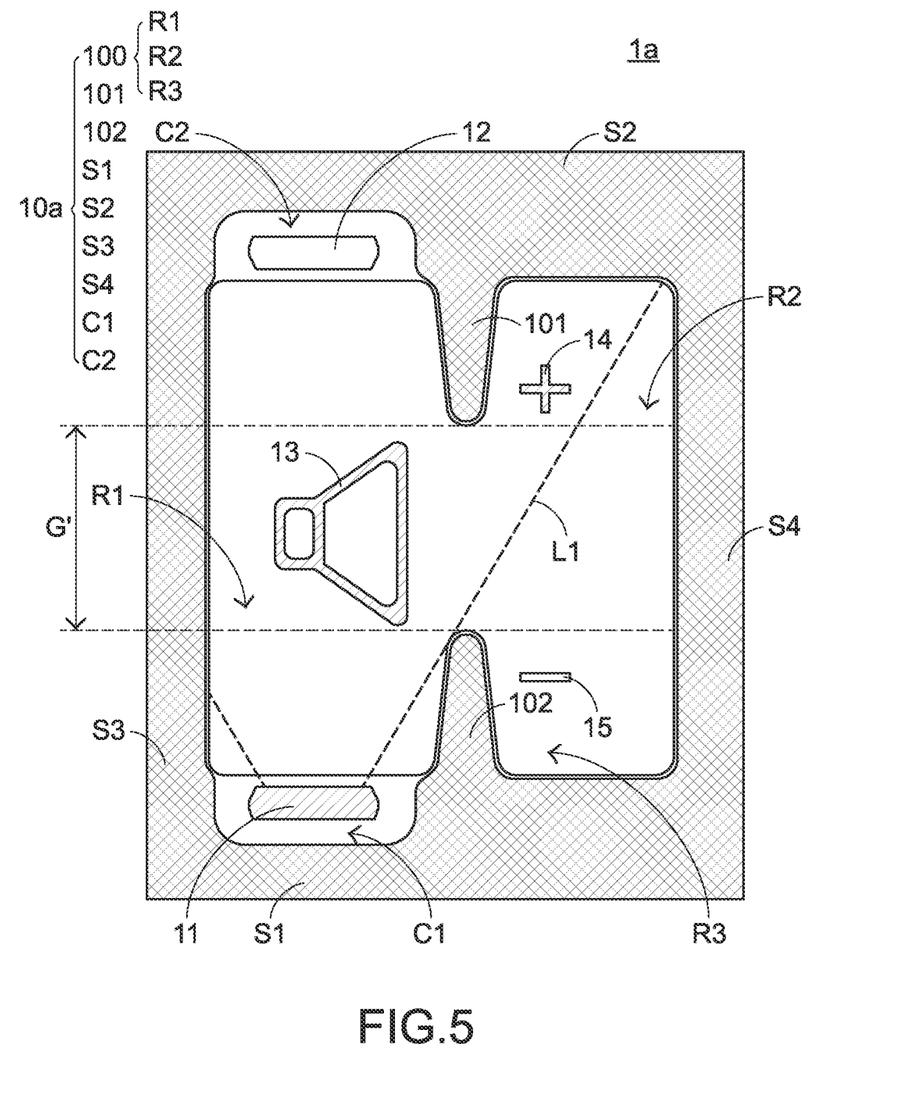
FIG. 5 schematically illustrates an icon display module according to a second embodiment of the present invention, in which the icon display module is in a first usage status.
Figure 6:
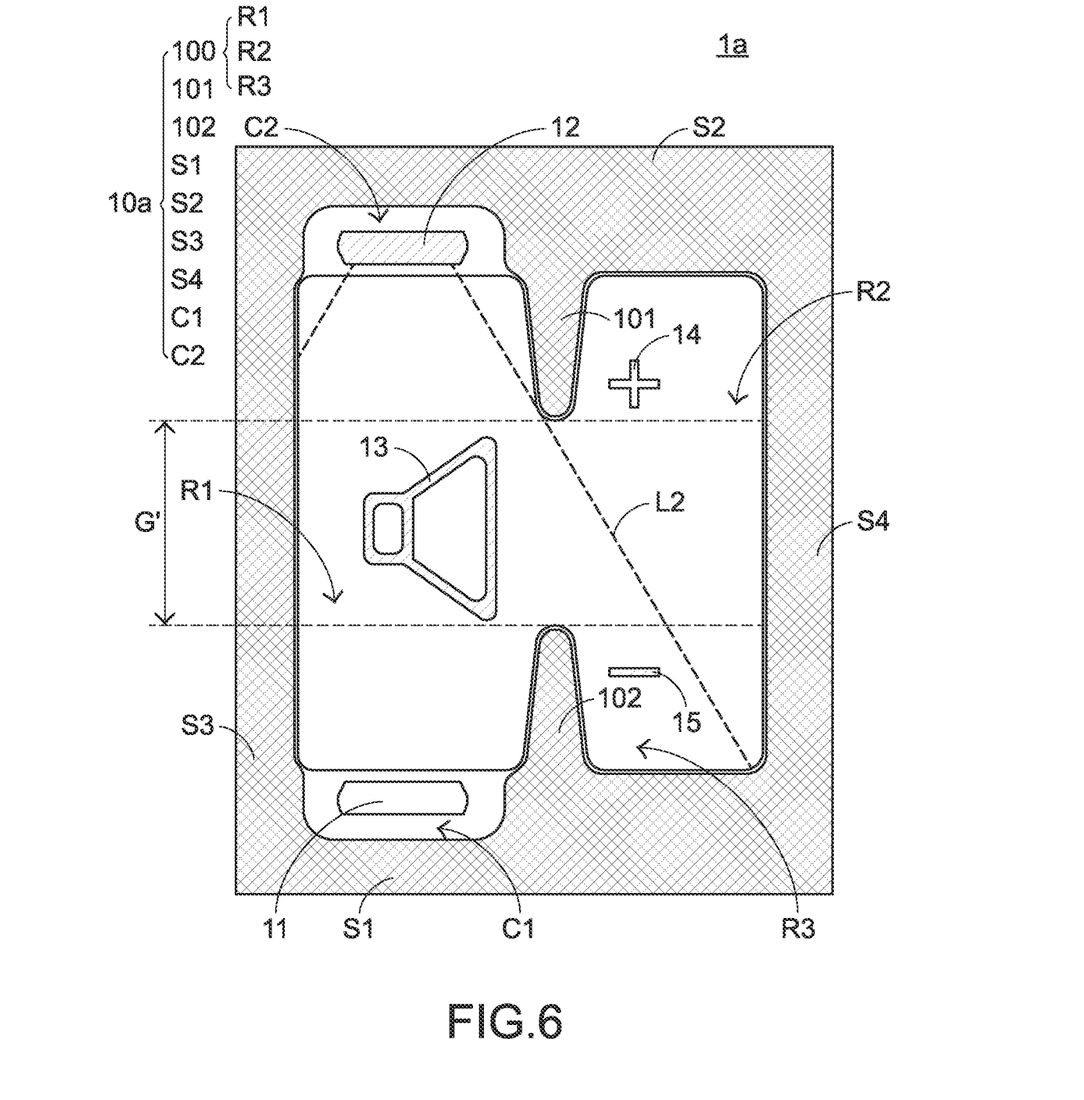
FIG. 6 schematically illustrates the icon display module according to the second embodiment of the present invention, in which the icon display module is in a second usage status.
Figure 7:
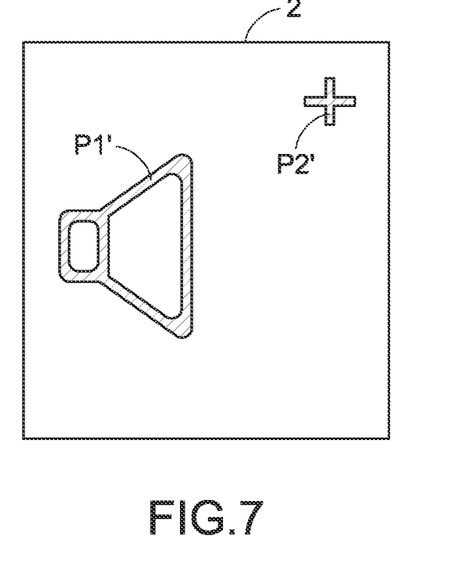
FIG. 7 schematically illustrates a target showing an icon corresponding to the icon display module of FIG. 5.
Figure 8:
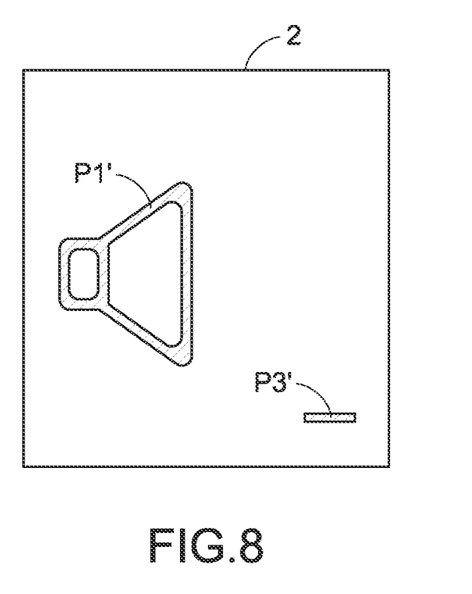
FIG. 8 schematically illustrates a target showing an icon corresponding to the icon display module of FIG. 6.

Please refer to FIGS. 5, 6, 7 and 8. FIG. 5 schematically illustrates an icon display module according to a second embodiment of the present invention, in which the icon display module is in a first usage status. FIG. 6 schematically illustrates the icon display module according to the second embodiment of the present invention, in which the icon display module is in a second usage status. FIG. 7 schematically illustrates a target showing an icon corresponding to the icon display module of FIG. 5. FIG. 8 schematically illustrates a target showing an icon corresponding to the icon display module of FIG. 6.

The structure of the icon display module 1a of this embodiment is similar to the icon display module 1 shown in FIGS. 1 and 2. In comparison with the icon display module 1, the icon display module 1a of this embodiment further comprise a third light-guiding pattern structure 15, and the light blocking structure 10 further comprises a second light-blocking part 102. Due to the arrangement of the additional components, the structure layout of the icon display module 1a is slightly distinguished. The structure layout of the icon display module 1a will be described as follows.

As shown in FIGS. 5 and 6, a first region R1, a second region R2 and a third region R3 are defined by the first light-blocking part 101 and the second light-blocking part 102 in the accommodation space 100 of the light blocking structure 10a. The first light-guiding pattern structure 13 is included in the first region R1 of the accommodation space 100. The second light-guiding pattern structure 14 is included in the second region R2 of the accommodation space 100. The third light-guiding pattern structure 15 is included in the third region R3 of the accommodation space 100.

As mentioned above, the first light-blocking part 101 of the light blocking structure 10a is installed on the second lateral wall S2. That is, the first light-blocking part 101 is protruded from the second lateral wall S2. The second light-blocking part 102 is installed on the first lateral wall S1. That is, the second light-blocking part 102 is protruded from the first lateral wall S1. Particularly, the first light-blocking part 101 is protruded from the second lateral wall S2 and extended in a direction toward the first lateral wall S1, and the second light-blocking part 102 is protruded from the first lateral wall S1 and extended in a direction toward the second lateral wall S2. In addition, there is a gap G' between the first light-blocking part 101 and the second light-blocking part 102.

As mentioned above, the first concave structure C1 of the light blocking structure 10a is formed in the first lateral wall S1. In addition, the first concave structure C1 and the second light-blocking part 102 are located beside with each other. The second concave structure C2 of the light-blocking structure 10a is formed in the second lateral wall S2. In addition, the second concave structure C2 and the first light-blocking part 101 are located beside with each other. In this embodiment, the first light-emitting element 11 of the icon display module 1a is disposed within the first concave structure C1. That is, the first light-emitting element 111 is located at a position beside the second light-blocking part 102. In addition, the second light-emitting element 12 is disposed within the second concave structure C2. That is, the second light-emitting element 12 is located at a position beside the first light-blocking part 101.

Please refer to FIGS. 5 and 7. In a first usage status, the first light-emitting element 11 of the icon display module 1a emits a first light beam L1. Since the first light beam L1 is blocked by the second light-blocking part 102, the first light beam L1 can be transferred through the first region R1 and the second region R2 of the accommodation space 100 only. When the first light beam L1 is transferred through both of the first region R1 and the second region R2 of the accommodation space 100, the first light beam L1 is irradiated on both of the first light-guiding pattern structure 13 in the first region R1 and the second light-guiding pattern structure 14 in the second region R2. Consequently, the first light beam L1 is guided by the first light-guiding pattern structure 13 and the second light-guiding pattern structure 14 and projected on the target 2. Under this circumstance, a first icon P1' corresponding to the first light-guiding pattern structure 13 and a second icon P2' corresponding to the second light-guiding pattern structure 14 are shown on the target 2.

Please refer to FIGS. 6 and 8. In a second usage status, the second light-emitting element 12 of the icon display module 1a emits a second light beam L2. Since the second light beam L2 is blocked by the first light-blocking part 101, the second light beam L1 can be transferred through the first region R1 and the third region R3 of the accommodation space 100 only. When the second light beam L2 is transferred through both of the first region R1 and the third region R3 of the accommodation space 100, the second light beam L2 is irradiated on both of the first light-guiding pattern structure 13 in the first region R1 and the third light-guiding pattern structure 15 in the third region R3. Consequently, the second light beam L2 is guided by the first light-guiding pattern structure 13 and the third light-guiding pattern structure 15 and projected on the target 2. Under this circumstance, the first icon P1' corresponding to the first light-guiding pattern structure 13 and a third icon P3' corresponding to the third light-guiding pattern structure 15 are shown on the target 2.

Similarly, different combined icons can be shown on a same shortcut function key through the icon display module 1a in different usage statuses. The shortcut function key can be designed to trigger two different shortcut functions. For example, the shortcut function key can be operated in either the operation status of enabling the sound volume increase function or the operation status of enabling the sound volume decrease function. In case that the shortcut function key is in the operation status of triggering the enabling the sound volume increase function, the combined icon of the first icon P1' and the second icon P2' is shown on the shortcut function key through the icon display module 1a. Whereas, in case that the shortcut function key is in the operation status of triggering the enabling the sound volume decrease function, the combined icon of the first icon P1' and the third icon P3' is shown on the shortcut function key through the icon display module 1a.

From the above descriptions, the present invention provides an icon display module. Through the icon display module, different combined icons can be shown on a same shortcut function key. Consequently, when the icon display module is installed on the input device, the shortcut function key on the input device can be designed to trigger two different shortcut functions. In this way, the number of shortcut function keys on the input device can be greatly reduced, allowing the user to quickly memorize and find the locations of the shortcut function keys. Consequently, the cost is reduced, and the user's operational convenience is largely enhanced. As mentioned above, a shortcut function key is designed to trigger two different shortcut functions. From a product design perspective, more shortcut function keys can be added to the input device in order to further improve the user's operational convenience.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An icon display module, comprising:
a light blocking structure comprising an accommodation space and a first light-blocking part, wherein the accommodation space is divided into a first region and a second region by the first light-blocking part;
a first light-emitting element disposed within the accommodation space;
a second light-emitting element disposed within the accommodation space;
a first light-guiding pattern structure disposed within the accommodation space, wherein the first light-guiding pattern structure is included in the first region; and
a second light-guiding pattern structure disposed within the accommodation space, wherein the second light-guiding pattern structure is included in the second region,
wherein when the first light-emitting element emits a first light beam, the first light beam is transferred through both of the first region and the second region, and the first light beam is irradiated on both of the first light-guiding pattern structure and the second light-guiding pattern structure, wherein the first light beam is guided by the first light-guiding pattern structure and the second light-guiding pattern structure and projected on the target, so that a first icon and a second icon are shown on the target,
wherein when the second light-emitting element emits a second light beam, the second light beam is blocked by the first light-blocking part, and the second light beam is permitted to be transferred through the first region only, wherein the second light beam is irradiated on the first light-guiding pattern structure, and the second light beam is guided by the first light-guiding pattern structure and projected to the target, so that the first icon is shown on the target.

2. The icon display module according to claim 1, wherein the light blocking structure further comprises a first lateral wall, a second lateral wall, a third lateral wall and a fourth lateral wall, wherein the first lateral wall and the second lateral wall are opposed to each other, the third lateral wall and the fourth lateral wall are opposed to each other, the third lateral wall and the fourth lateral wall are arranged between the first lateral wall and the second lateral wall, and the accommodation space is defined by the first lateral wall, the second lateral wall, the third lateral wall and the fourth lateral wall collaboratively, wherein the first light-blocking part is installed on the second lateral wall, and the first light-blocking part is protruded from the second lateral wall and extended in a direction toward the first lateral wall, wherein there is a gap between the first light-blocking part and the first lateral wall.

3. The icon display module according to claim 2, wherein the light blocking structure further comprises a first concave structure and a second concave structure, wherein the first concave structure is formed in the first lateral wall, the first concave structure and the first light-blocking part are opposed to each other, the second concave structure is formed in the second lateral wall, and the second concave structure and the first light-blocking part are located beside each other, wherein the first light-emitting element is disposed within the first concave structure, and the second light-emitting element is disposed within the second concave structure.

4. The icon display module according to claim 1, wherein the icon display module further comprises a third light-guiding pattern structure, and the light blocking structure further comprises a second light-blocking part, wherein the accommodation space is divided into the first region, the second region and a third region by the first light-blocking part and the second light-blocking part, and the third light-guiding pattern structure is disposed within the accommodation space and included the third region,
wherein when the first light-emitting element emits the first light beam, the first light beam is blocked by the second light-blocking part, and the first light beam is permitted to be transferred through the first region and the second region only, wherein the first light beam is irradiated on both of the first light-guiding pattern structure and the second light-guiding pattern structure, and the first light beam is guided by the first light-guiding pattern structure and the second light-guiding pattern structure and projected on the target, so that the first icon and the second icon are shown on the target,
when the second light-emitting element emits the second light beam, the second light beam is blocked by the first light-blocking part, and the second light beam is permitted to be transferred through the first region and the third region only, wherein the second light beam is irradiated on both of the first light-guiding pattern structure and the third light-guiding pattern structure, and the second light beam is guided by the first light-guiding pattern structure and the third light-guiding pattern structure and projected on the target, so that the first icon and a third icon are shown on the target.

5. The icon display module according to claim 4, wherein the light blocking structure further comprises a first lateral wall, a second lateral wall, a third lateral wall and a fourth lateral wall, wherein the first lateral wall and the second lateral wall are opposed to each other, the third lateral wall and the fourth lateral wall are opposed to each other, the third lateral wall and the fourth lateral wall are arranged between the first lateral wall and the second lateral wall, and the accommodation space is defined by the first lateral wall, the second lateral wall, the third lateral wall and the fourth lateral wall collaboratively, wherein the first light-blocking part is installed on the second lateral wall, the second light-blocking part is installed on the first lateral wall, the first light-blocking part is protruded from the second lateral wall and extended in a direction toward the first lateral wall, and the second light-blocking part is protruded from the first lateral wall and extended in a direction toward the second lateral wall, wherein there is a gap between the first light-blocking part and the second light-blocking part.

6. The icon display module according to claim 5, wherein the light blocking structure further comprises a first concave structure and a second concave structure, wherein the first concave structure and the second concave structure are opposed to each other, the first concave structure is formed in the first lateral wall, and the first concave structure and the second light-blocking part are located beside each other, the second concave structure is formed in the second lateral wall, and the second concave structure and the first light-blocking part are located beside each other, wherein the first light-emitting element is disposed within the first concave structure, and the second light-emitting element is disposed within the second concave structure.

7. The icon display module according to claim 1, wherein a color of the first light beam from the first light-emitting element and a color of the second light beam from the second light-emitting element are different.

8. The icon display module according to claim 1, wherein the icon display module is installed in an input device, and the target is a shortcut function key installed on the input device.

* * * * *